United States Patent Office 3,455,793
Patented July 15, 1969

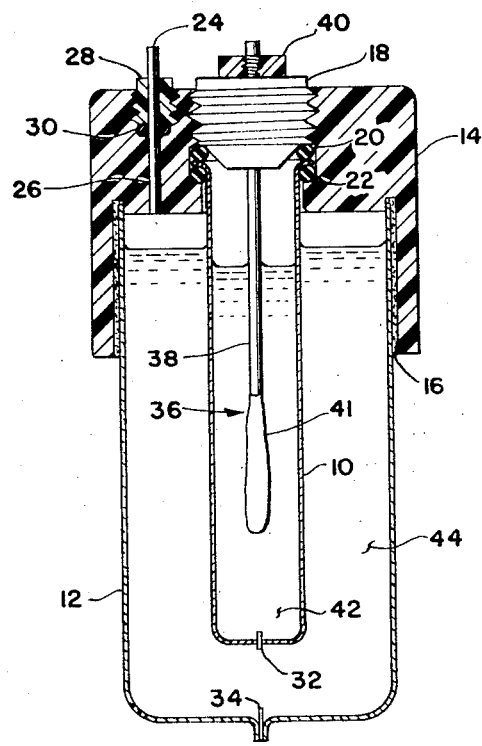

3,455,793
METHOD OF PROVIDING FOR LIQUID JUNCTION
Hideo Watanabe and Edmund E. Buzza, Fullerton, Calif., assignors to Beckman Instruments, Inc., a corporation of California
Filed June 18, 1965, Ser. No. 465,129
Int. Cl. B01k 3/02
U.S. Cl. 204—1                                              4 Claims

ABSTRACT OF THE DISCLOSURE

The specification discloses a reference electrode for measuring the pH of high purity water at elevated temperatures and comprises two liquid junctions, a first liquid junction communicating a silver-silver chloride internal half cell immersed in a silver chloride saturated potassium chloride solution disposed in an inner tube with a pure potassium chloride solution disposed in an outer tube while the second liquid junction communicates the pure potassium chloride solution with a test sample external the outer tube. A pressure differential may be established across the first liquid junction so as to prevent the flow of the silver chloride saturated potassium chloride solution from passing into the pure potassium chloride solution. This arrangement prevents dissolved silver chloride from reaching the high purity water thereby preventing precipitation of the silver chloride and the clogging of the second liquid junction.

---

The invention described herein was made in performance of work under a NASA contract and is subject to the provision of the National Aeronautics and Space Act of 1958, Public Law 85–568 (72 Stat. 426; 42 U.S.C. 2451), as amended.

This invention relates to a reference electrode and, more particularly, to an electrochemical reference electrode of the type that is used with glass electrodes for measuring the ion activity or concentration of solutions.

A reference electrode for use in making ionic measurements of solutions usually comprises an internal half cell formed of a metal and a sparingly soluble salt of the metal, for example, AgCl or $Hg_2Cl_2$, supported within a glass tube containing a salt bridge solution, typically saturated potassium chloride. Electrical connection between the salt bridge solution and the sample or a test solution is made by a liquid contact via a suitably formed aperture or passage in the salt bridge containing tube, sometimes referred to as a leak structure or a liquid junction.

It has been discovered that during the measuring of the ion concentration of solutions having a lower anion concentration than that of the solution in the reference electrode, soluble complexes of the metal salt of the internal half cell reverse and dissociate to a solid precipitate which plugs the leak structure, thus resulting in changing liquid junction potentials and, therefore, unstable pH measurements. This problem is most prevalent in the ion concentration measurements of high purity water where it is generally desirable to utilize a silver-silver chloride internal half cell due to the high temperatures generally encountered in these types of measurements. In order to maintain a stable internal half cell at such high temperatures, sufficient silver chloride must be provided to saturate the salt bridge solution. However, when contacting the high purity water with a reference electrode containing a salt bridge solution saturated with silver chloride, the soluble complex $AgCl_2^-$ and other soluble complexes of AgCl dissociate to insoluble AgCl and $Cl^-$ as the solution is diluted with the high purity water. The clogging of the leak structure of the reference electrode by the silver chloride precipitate could be overcome by providing a leak structure having a sufficiently high flow rate to wash the precipitate away. However, this is not a desirable solution to the problem inasmuch as it would require that the salt bridge solution in the reference electrode be replenished frequently and also would be wholly impractical in the measurement of high purity water when it is desired not to contaminate the water with the large flow of salt bridge solution.

It is, therefore, the principal object of the present invention to provide an electrochemical reference electrode having a leak structure which does not become clogged by a precipitate when contacting sample solutions such as high purity water.

Another object of the invention is to provide an electrochemical reference electrode having a leak structure which does not become clogged by precipitates when contacting low anion concentration sample solutions, yet has a relatively low flow rate therethrough.

According to the principal aspect of the present invention, there is provided a double salt bridge reference electrode comprising two containers, each having a leak structure therein. In one of the containers, an internal half cell formed of a metal and a sparingly soluble salt of the metal is immersed in a first salt bridge solution which, preferably, is saturated with the salt of the internal half cell. The first salt bridge solution is in ionic communication with a second salt bridge solution in the second container through the leak structure in the first container whereas the second salt bridge solution in the second container contacts the sample solution via the leak structure in the second container. The second salt bridge solution is free of the sparingly soluble salt of the half cell so that the dissolved soluble salt is not present in the leak structure of the second container where it would form a precipitate and clog the leak structure upon contact with the sample solution. In addition, a pressure differential is provided between the two salt bridge solutions with the greater pressure being on the solution in the second container adjacent the leak structure in the first container so that the first salt bridge solution containing the dissolved salt of the half cell is prevented from flowing into the second container and to the leak structure therein. Consequently, when the reference electrode contacts a sample solution such as high purity water, no precipitate of the salt of the internal half cell clogs the leak structure contacting the sample solution. Hence, a continuous flow of the second salt bridge solution results and, therefore, a constant junction potential for the reference electrode is provided.

Other objects, advantages and aspects of the invention will become more apparent upon reference to the following specification and drawing which shows a preferred form of the reference electrode of the invention in elevation view, partly in section.

Referring now to the drawing in detail, the reference electrode of the invention comprises a first glass tube or chamber 10 mounted in a second glass tube or chamber 12 by means of a cap 14, preferably formed of plastic or the like. The cap is sealed to the tube 12 by means of cement 16. The tube 10 is mounted in the cap 14 by a threaded plug 18 and association O-rings 20 and 22. A tube 24 is mounted within an opening 26 in the cap by means of another plug 28 and O-ring 30. The purpose of the tube 24 will be explained later. A leak structure 32 is provided at the bottom of the tube 10 to provide a path for the flow of solution between the tube 10 and the outer tube 12 and a second leak structure 34 is provided in tube 12 to provide communication from its interior to the sample solution outside of the assembly.

As explained previously, the reference electrode of the invention has its greatest advantage for use in the measurement of high purity water. In such measurements, high temperatures are often encountered. Therefore, it is preferable to use a silver-silver chloride internal half cell in the reference electrode and a salt bridge solution saturated with silver-silver chloride in order to maintain the stability of the internal half cell. Consequently, there is shown in the drawing an internal half cell 36 comprising a silver wire 38 retained in the plug 18 by a nut 40. The portion of the wire 38 extending above the nut 40 provides the terminal for the reference electrode. The lower portion of the wire 38 mounted in the tube 10 is coated with silver chloride 41 to complete the internal half cell structure of the assembly. The tube 10 is filled with a 4 molar KCl solution 42 which is saturated with silver chloride.

If the tube 10, which alone constitutes a reference electrode, were to contact a solution having a low chloride ion concentration, such as high purity water, the complex $AgCl_2^-$ would immediately dissociate to a AgCl precipitate which would clog the leak structure 32. The clogging of the leak structure which contacts the sample solution is prevented, in accordance with the present invention, by providing a second salt bridge solution 44 in tube 12 which is free of dissolved silver chloride, for example, pure saturated KCl, and by producing a greater pressure on the solution 44 adjacent the leak structure 32 than on the solution 42 within the tube 10 so that none of the solution 42 containing dissolved silver chloride can reach the leak structure 34. This may be accomplished by filling the tube 12 with the salt bridge solution 44 to a higher level than the level of solution 42 in the tube 10 so that the solution in the outer tube has an elevated hydrostatic pressure at the leak structure 32. The pressure differential at the leak structure 32 may also be accomplished by pressurizing the solution 44 in tube 12 by connecting the tube 24 to an external source of fluid pressure, for example, air or 4 molar or saturated KCl solution. When using an external source of fluid pressure, it is important that the tube 10 be in sealing relationship with respect to the tube 12, as is provided by the O-rings 20 and 22, in order to prevent the fluid pressure being applied to the salt bridge solution 44 in tube 12 from being transmitted to the solution 42 in the tube 10. Consequently, by the invention, the solution 42 saturated with silver chloride in the tube 10 cannot flow into the outer tube 12 nor through the leak structure 34 where AgCl precipitate would form to clog the leak structure. If the leak structure 32 has a slightly faster flow rate than the leak structure 34 in tube 12, it has been found that ionic communication between the solutions 42 and 44 via the leak structure 32 is by diffusion only.

In one electrode constructed in accordance with the invention, the leak structure 34 was formed of a palladium wire sealed in an opening in the tube 12, as described in U.S. Patent No. 2,705,220, and the leak structure 32 was a conventional asbestos fiber, it was found that when the electrode was connected to a pH meter together with a glass electrode, very little drift in the pH reading occurred over a twelve-hour period. This test clearly showed that none of the dissolved silver chloride in the solution 42 reached the leak structure 34 to form a silver chloride precipitate and, hence, a very steady flowing junction was provided.

Although the reference electrode of the invention has been described as utilizing a silver-silver chloride internal half cell 36, it is understood that other half cells might be used, such as AgBr or $Hg_2Cl_2$. Also, the invention is not to be restricted to the specific form shown in the drawing, inasmuch as the two tubes 10 and 12 may be mounted side by side, rather than concentrically, if means are provided for establishing fluid communication between the leak structure 32 in the tube 10 and the interior of the second tube 12.

It will be understood that various other changes can be made in the form, details, arrangement and proportions of the various parts in the embodiment disclosed herein without departing from the spirit and scope of the invention as defined by the appended claims.

What is claimed is:

1. A method of making a reference contact with a sample solution comprising the steps of:
   providing first and second containers interconnected by a first leak structure with said first container having disposed therein an internal half cell formed of a metal and a sparingly soluble salt of said metal and said second container having a second leak structure for contacting the sample solution;
   filling said first container with a first salt bridge solution containing said sparingly soluble salt;
   filling said second container with a second salt bridge solution free of said sparingly soluble salt;
   producing a greater pressure on said second salt bridge solution adjacent said first leak structure than on said first salt bridge solution whereby said first salt bridge solution is prevented from flowing into said second container; and
   contacting said sample with said second leak structure.

2. A method as set forth in claim 1 wherein said production of said greater pressure on said second salt bridge solution than on said first salt bridge solution is accomplished by providing a level of said second salt bridge solution in said second container higher than the level of said first salt bridge solution in said first container.

3. A method of making a reference contact with a sample comprising the steps of:
   providing first and second containers interconnected by a first leak structure with said first container having a Ag-AgCl half cell disposed therein and said second container having a second leak structure for contacting the sample solution;
   filling said first container with a first salt bridge solution saturated with AgCl;
   filling said second container with a second salt bridge solution free of AgCl;
   producing a greater pressure on said second salt bridge solution adjacent said first leak structure than on said first salt bridge solution whereby said first salt bridge solution is prevented from flowing into said second container; and
   contacting said sample with said second leak structure.

4. A method of making a reference contact with a sample solution comprising the steps of:
   providing first and second containers interconnected by a first leak structure with said first container having disposed therein an internal half cell formed of a metal and a sparingly soluble salt of said metal and said second container having a second leak structure for contacting the sample solution;
   filling said first container with a first salt bridge solution;
   filling said second container with a second salt bridge solution free of said sparingly soluble salt;
   pressurizing said second container with an external source of fluid pressure to produce a greater pressure on said second salt bridge solution adjacent said first leak structure than on said first salt bridge solution whereby said first salt bridge solution is prevented from flowing into said second container; and contacting said sample with said second leak structure.

References Cited

UNITED STATES PATENTS

| | | | |
|---|---|---|---|
| 2,846,386 | 8/1958 | Ingruber | 204—195 |
| 2,925,370 | 2/1960 | Rohrer | 204—195 |
| 3,103,480 | 9/1963 | Watanabe et al. | 204—195 |
| 3,152,057 | 10/1964 | Conger et al. | 204—195 |
| 3,208,928 | 9/1965 | Landers et al. | 204—195 |
| 3,267,016 | 8/1966 | Arthur | 204—195 |
| 3,077,446 | 2/1963 | Van Den Berg | 204—195 |
| 3,145,158 | 8/1964 | Matsuyama | 204—195 |
| 3,152,058 | 10/1964 | Hutchison et al. | 204—195 |
| 3,281,348 | 10/1966 | Schmacher et al. | 204—195 |

JOHN H. MACK, Primary Examiner

T. TUNG, Assistant Examiner

U.S. Cl. X.R.

204—195